(12) United States Patent
Lee

(10) Patent No.: US 10,824,944 B2
(45) Date of Patent: Nov. 3, 2020

(54) METHOD FOR FEATURE DATA RECALIBRATION AND APPARATUS THEREOF

(71) Applicant: Lunit Inc., Seoul (KR)

(72) Inventor: Hyun Jae Lee, Seoul (KR)

(73) Assignee: LUNIT INC., Seoul (KR)

( * ) Notice: Subject to any disclaimer, the term of this patent is extended or adjusted under 35 U.S.C. 154(b) by 0 days.

(21) Appl. No.: 16/676,694

(22) Filed: Nov. 7, 2019

(65) Prior Publication Data

US 2020/0302290 A1 Sep. 24, 2020

(30) Foreign Application Priority Data

Mar. 20, 2019 (KR) .......................... 10-2019-0031664

(51) Int. Cl.
*G06N 3/08* (2006.01)
*G06F 17/18* (2006.01)
*G06T 3/00* (2006.01)
*G06N 20/00* (2019.01)

(52) U.S. Cl.
CPC .............. *G06N 3/08* (2013.01); *G06F 17/18* (2013.01); *G06N 20/00* (2019.01); *G06T 3/0006* (2013.01)

(58) Field of Classification Search
CPC ...... G06N 3/0454; G06N 3/0472; G06N 3/08; G06N 3/10; G06F 2207/4824; G06F 17/15

See application file for complete search history.

(56) References Cited

U.S. PATENT DOCUMENTS

2016/0217368 A1* 7/2016 Ioffe ..................... G06N 3/04
2018/0060722 A1* 3/2018 Hwang ................ G06N 3/0454

FOREIGN PATENT DOCUMENTS

KR 10-2017-0108081 9/2017

OTHER PUBLICATIONS

Roy et al., "Recalibrating Fully Convolutional Networks with Spatial and Channel "Squeeze and Excitation" Blocks", IEEE, vol. 38, Aug. 2018 pp. 1-11 (Year: 2018).*
Abhijit Guha Roy et al., "Recalibrating Fully Convolutional Networks With Spatial and Channel 'Squeeze and Excitation' Blocks", IEEE Transactions on Medical Imaging, vol. 38, No. 2, Feb. 2019.
Jie Hu et al., "Squeeze-and-Excitation Networks", arXIV, May 16, 2019, arXiv:1709.01507v4.

* cited by examiner

*Primary Examiner* — Paulinho E Smith
(74) *Attorney, Agent, or Firm* — Lex IP Meister, PLLC

(57) ABSTRACT

A method of recalibrating a feature data of each channel generated by a convolution layer of a convolution neural network is provided. According to some embodiments, since an affine transformation is applied to the feature data of each channel independently of the feature data of the other channel, the overall number of parameters defining the affine transformation is minimized. As a result, the amount of computations required in performing the feature data recalibration can be reduced.

12 Claims, 9 Drawing Sheets

METHOD FOR FEATURE DATA RECALIBRATION AND APPARATUS THEREOF

CROSS-REFERENCES TO THE RELATED APPLICATIONS

This application claims priority from Korean Patent Application No. 10-2019-0031664 filed on Mar. 20, 2019, in the Korean Intellectual Property Office, the disclosure of which is incorporated herein by reference in its entirety.

BACKGROUND

(a) Field

The present disclosure relates to a feature data recalibration method and apparatus. More specifically, the present disclosure relates to a recalibration method efficient in the amount of computation, which performs an independent process for each channel on a feature data of each channel output from a convolution layer of a convolution neural network (CNN), and an apparatus for supporting the method.

(b) Description of the Related Art

A neural network is a machine learning model that simulates the structure of a human neuron. The neural network includes one or more layers, and output data of each layer are used as an input of a next layer. Recently, researches on the use of a deep neural network including multiple layers have been intensively conducted. The deep neural network plays an important role in improving recognition performance in various fields such as speech recognition, natural language processing, and lesion diagnosis.

A convolution neural network, which is one type of the deep neural network, generates feature data of each channel in a convolution layer, and a pooling layer further abstracts the generated feature data. After input data pass through the convolution layer and the pooling layer, the number of values on a spatial domain axis of the input data reduces, but the number of channels increases. When the number of values on the spatial domain axis of the feature data is sufficiently reduced through iterated operations of passing through the convolution layer and the pooling layer, the values of the feature data are input to a fully connected neural network (FCNN).

The feature data of each channel generated in the convolution layer are a result obtained by inputting the input data to a filter of each channel. However, not all channels have the same level of importance. Therefore, feature data recalibration which can more strengthen feature data of important channel than feature data of other channels is required.

SUMMARY

Some embodiments of the present disclosure provide a method of reducing an amount of computations required for feature data recalibration, and an apparatus supporting the method.

Some embodiments of the present disclosure provide a feature data recalibration method based on style information of each image, and an apparatus and system supporting the method.

It should be noted that objects of the present disclosure are not limited to the above-described objects, and other objects of the present disclosure will be apparent to the person of ordinary skill in the art from the following descriptions.

According to an embodiment of the present invention, a feature data recalibration method may be provided. The feature data recalibration method includes receiving a feature data of each of a plurality of channels generated by a convolution neural network and recalibrating the feature data of each of the plurality of channels by performing independent affine transformation on the feature data of each of the plurality of channels. Recalibrating the feature data of each of the plurality of channels includes obtaining an importance weight of a first channel among the plurality of channels by performing a first affine transformation on the feature data of the first channel, obtaining an importance weight of a second channel among the plurality of channels by performing a second affine transformation on the feature data of the second channel, the second affine transformation having at least one different parameter from the first affine transformation, recalibrating the feature data of the first channel by reflecting the importance weight of the first channel, and recalibrating the feature data of the second channel by reflecting the importance weight of the second channel.

In some embodiments, the feature data of the first channel may be a two-dimensional feature map of the first channel, and obtaining the importance weight of the first channel may include obtaining a representative value of the feature map of the first channel and obtaining the importance weight of the first channel by performing the first affine transformation on the representative value. In this case, obtaining the importance weight of the first channel by performing the first affine transformation on the representative value may include obtaining a first statistical representative value of feature values included in the feature map of the first channel, obtaining a second statistical representative value of the feature values included in the feature map of the first channel, and inputting the first and the second statistical representative values into the first affine transformation, and obtaining the importance weight of the first channel that is an output of the first affine transformation.

In some embodiments, a data input to the convolution neural network may be an image data, the feature data of the first channel may include a two-dimensional feature map of the first channel, and obtaining the importance weight of the first channel may include obtaining the importance weight of the first channel by performing a first affine transformation on style information of the two-dimensional feature map of the first channel. In this case, the style information of the two-dimensional feature map of the first channel may include an average and standard deviation of feature values of the two-dimensional feature map of the first channel. Obtaining the importance weight of the first channel by performing the first affine transformation on the style information of the two-dimensional feature map of the first channel may include performing the first affine transformation on the style information of the two-dimensional feature map of the first channel, and obtaining the importance weight of the first channel by applying an activation function to a result of the first affine transformation. The image data input to the convolution neural network may include an image data of a first style and an image data of a second style.

In some embodiments, a parameter of the first affine transformation may be learned when the convolution neural network by using the feature data of the first channel, and the parameter of the second affine transformation may be learned when the convolution neural network is learned by using the feature data of the second channel.

In some embodiments, recalibrating the feature data of the first channel may include setting a result obtained by multiplying the feature data of the first channel by the importance weight of the first channel as a recalibrated feature data of the first channel.

According to another embodiment of the present disclosure, a machine learning apparatus including a memory storing one or more instructions and a processor is provided. The processor executes the one or more instructions, to receive a feature data of each of a plurality of channels generated by a convolution neural network, and to recalibrate the feature data of each of the plurality of channels by performing independent affine transformation on the feature data of each of the plurality of channels. Recalibrating the feature data of each of the plurality of channels includes obtaining the feature data of a first channel among the plurality of channels and the feature data of a second channel among the plurality of channels, obtaining an importance weight of a first channel among the plurality of channels by performing a first affine transformation on the feature data of the first channel, obtaining an importance weight of a second channel among the plurality of channels by performing a second affine transformation on the feature data of the second channel, the second affine transformation being different from the first affine transformation, recalibrating the feature data of the first channel by reflecting the importance weight of the first channel, and recalibrating the feature data of the second channel by reflecting the importance weight of the second channel.

In some embodiments, a data input to the convolution neural network may be an image data, the feature data of the first channel may include a two-dimensional feature map of the first channel, and the processor may obtain the importance weight of the first channel by performing the first affine transformation on style information of the two-dimensional feature map of the first channel. In this case, the processor may obtain the importance weight of the first channel by performing the first affine transformation on the style information of the two-dimensional feature map of the first channel and applying an activation function to a result of the first affine transformation. The image data input to the convolution neural network may include an image data of a first style and an image data of a second style.

In some embodiments, a parameter of the first affine transformation may be learned when the convolution neural network is learned by using the feature data of the first channel, and a parameter of the second affine transformation may be learned when the convolution neural network is learned by using the feature data of the second channel.

In some embodiments, the processor may set a result obtained by multiplying the feature data of the first channel by the importance weight of the first channel as a recalibrated feature data of the first channel.

According to yet another embodiment of the present disclosure, a computer program stored in a non-transitory computer-readable medium is provided. The computer program causes a computing device to execute receiving a feature data of each of a plurality of channels generated by a convolution neural network, and recalibrating the feature data of each of the plurality of channels by performing independent affine transformation on the feature data of each of the plurality of channels. Recalibrating the feature data of each of the plurality of channels includes obtaining the feature data of a first channel among the plurality of channels and the feature data of a second channel among the plurality of channels, obtaining an importance weight of a first channel among the plurality of channels by performing a first affine transformation on the feature data of the first channel and obtaining an importance weight of a second channel among the plurality of channels by performing a second affine transformation on the feature data of the second channel, the second affine transformation being different from the first affine transformation, and recalibrating the feature data of the first channel by reflecting the importance weight of the first channel and recalibrating the feature data of the second channel by reflecting the importance weight of the second channel.

DETAILED DESCRIPTION OF THE EMBODIMENTS

Figure 1:
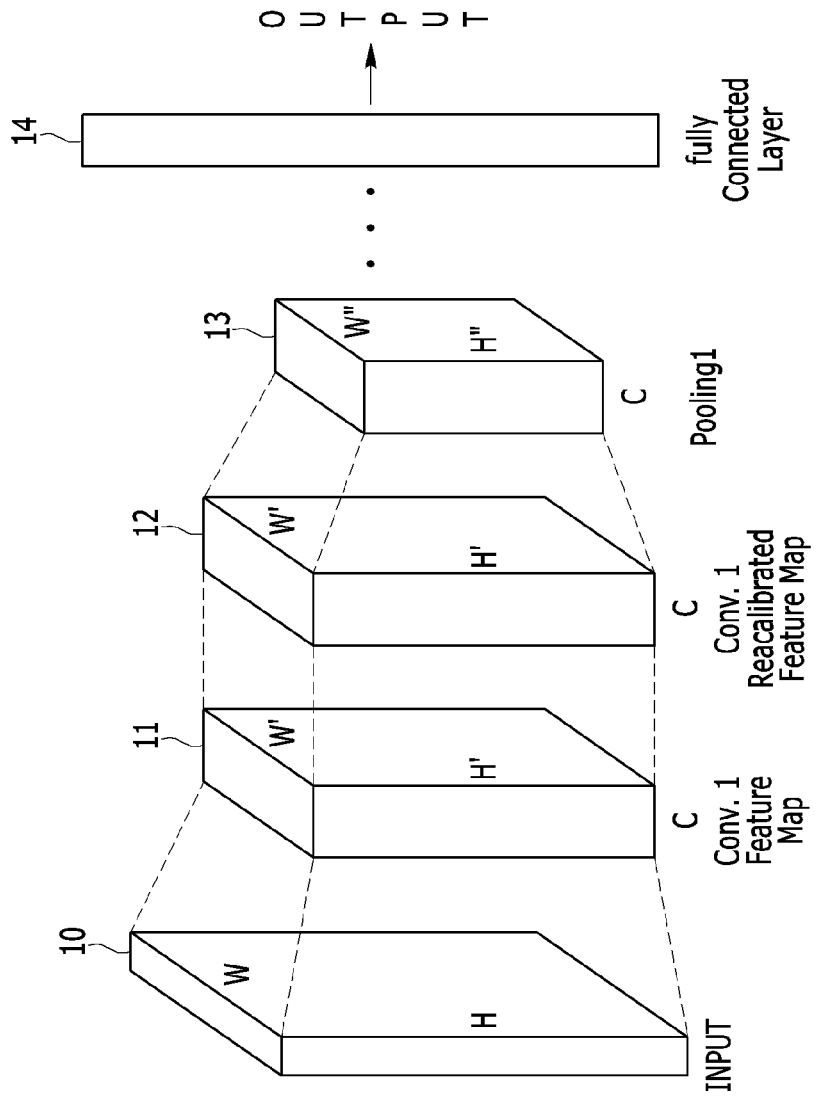
FIG. 1 is a diagram for explaining a neural network architecture where feature data recalibration according to some embodiments of the present disclosure is applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and completed and will fully convey the concept of the disclosure to the person of ordinary skill in the art, and the present disclosure will only be defined by the appended claims. Like reference numerals designate like elements throughout the specification.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

In will be further understood that, although the terms first, second, and the like may be used herein to describe various elements, components, steps and/or operations. These terms are only used to distinguish one element, component, step or operation from another element, component, step, or operation. Thus, a first element, component, step or operation discussed below could be termed as a second element, components, step or operation without departing from the teaching of the present inventive concept.

Hereinafter, some embodiments of the present disclosure are described in detail with reference to the accompanying drawings.

FIG. 1 is a diagram for explaining a neural network architecture where feature data recalibration according to some embodiments of the present disclosure is applied.

Referring to FIG. 1, learning of a neural network begins with inputting an input data 10 to neural network architecture. The learning may be understood as updating a weight between adjacent layer nodes of the neural network by using an error value of output data.

The neural network architecture referred in some embodiments of the present disclosure is assumed to be based on a convolution neural network that uses a plurality of filters (kernels). When the input data 10, which is an image having a width of W and a height of H, is input to a first convolution layer, the first convolution layer outputs a plurality of feature data 11 each having a width of W' and a height of H'. Here, the number of the feature data 11 is C which is equal to the number of filters and the number of channels. The feature data 11 may be indicated as a two-dimensional vector or a two-dimensional feature map.

When a feature data recalibration method according to some embodiments of the present discourse is applied to the feature data 11 that have passed through the first convolution layer, a plurality of recalibrated feature data 12 are generated. Depending on embodiments, the recalibrated feature data 12 may not be generated separately from the feature data 11, but the feature data 11 may be converted into the recalibrated feature data 12.

When the recalibrated feature data 12 are input to a first pooling layer, the first pooling layer outputs a plurality of feature data 13 whose width W" and height H" are further abstracted. Here, the number of the feature data 13 is C which is equal to the number of filters and the number of channels. In addition, a series of operations of passing the feature data through the convolution layer, recalibrating the feature data output from the convolution layer, and passing the recalibrated feature data through the pooling layer may be iterated, so that the width and height can be abstracted as necessary. Further, after the width and height are abstracted as necessary, the feature data may be input to a fully connected neural network (FCNN) 14. Then FCNN 14 may be learned so as to produce an output that is fit for the machine learning purpose of the neural network architecture.

As described above with reference to FIG. 1, a feature data recalibration method according to some embodiments of the present disclosure adjusts the feature data of each channel (channel-wise feature data) output from the convolution layer so as to be enhanced or weakened depending on the importance of each channel (channel-wise importance) and then transmits the feature data to the pooling layer. The feature data recalibration method according to some embodiments of the present disclosure may be applied to the feature data output from the pooling layer. Compared to the feature data output from the convolution layer, a feature of the feature data output from the pooling layer is more abstracted and its data size is smaller. Therefore, when the feature data recalibration method is applied to the feature data output from the pooling layer, a smaller amount of computation may be required for the feature data recalibration.

Figure 2:
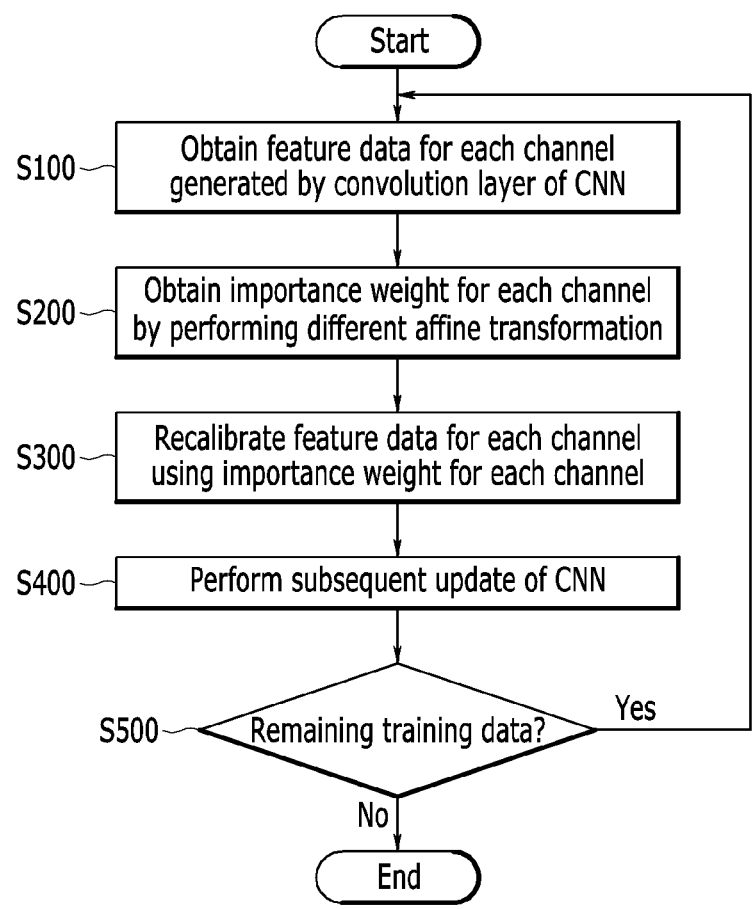
FIG. 2 is a flowchart showing a feature data recalibration method according to an embodiment of the present disclosure.

Hereinafter, a feature data recalibration method according to an embodiment of the present invention will be described with reference to FIG. 2. The method according to the embodiment may be performed by one or more computing devices. For example, all operations described with reference to FIG. 2 may be performed by the same computing device. Alternatively, some operations may be performed by one computing device and the other some operations may be performed by the other computing device.

In step S100, a feature data of each channel that is output from a convolution layer of a convolution neural network (CNN) is obtained. As described above, the recalibration method according to some embodiments of the present disclosure may be performed on the feature data which is output from a pooling layer. In this case, the feature data of each channel that is output from the pooling layer may be obtained.

The feature data include feature data of at least two channels. For example, the feature data may include feature data of a first channel and feature data of a second channel. The feature data of the first channel may be a data output by applying a first filter to an input data, and the feature data of the second channel may be a data output by applying a second filter to the input data.

A dimension of the feature data may be determined according to a dimension of the input data and a type of filter applied thereto. For example, when the input data is expressed in two dimensions and the applied filter does not change the dimension of the data, the feature data may be a two-dimensional feature map. As an example of the two-dimensional data, an image may be provided. In addition, when the input data is expressed in three dimensions and the applied filter is configured to reduce the dimension of the data by one dimension, the feature data may be a two-dimensional feature map.

Since the recalibration method according to the present embodiment does not limit the dimension of the feature data to a specific dimension, it may be widely applied to machine learning using a multi-dimensional input data and various types of convolution filters. This is because the recalibration method according to the present embodiment obtains an importance weight of each channel (channel-wise importance weight) by performing affine transformation on the feature data of each channel, and the affine transformation has no limitation on the dimension of the input data (vector).

In some embodiments, after obtaining style information of the feature data of each channel, the style information may be input into an affine transformation, which will be described with reference to FIG. 4.

In step S200, different affine transformations are performed for each channel, and an importance weight of each channel is obtained by using the result of the affine transformation. For example, a first affine transformation may be performed for the first channel, and a second affine transformation may be performed for the second channel. In some embodiments, the first affine transformation may have parameters, at least one of which is different from those of the second affine transformation.

The parameters of each affine transformation may be learned during a learning process of the convolutional neural network. For example, the parameters of the first affine transformation for the first channel may be learned by using the feature data of the first channel, and the parameters of the second affine transformation for the second channel may be learned by using the feature data of the second channel. For example, each affine transformation may be implemented by using a fully connected neural network (FCNN). In other words, in terms of network architecture, an independent FCNN may follow the convolution layer for each channel.

The importance weight indicates the importance of each channel and may be a value or a two or more dimensional vector.

In this embodiment, since a different affine transformation is applied to each channel independently, increase in the amount of computations for recalibration may be minimized According to a simulation result, the number of parameters (number of weights included in the entire neural network) added for performing the recalibration method according to the present embodiment has been suppressed to 0.015% level in Resnet-50, which is a well-known pre-trained model. As a result, even in a computing device with limited computing power, machine learning may be performed by using the feature data recalibration method according to the present embodiment.

Next, in step S300, the feature data of each channel obtained in step S100 is recalibrated by using the importance weight of each channel. For example, the feature data of the first channel may be recalibrated by multiplying the feature data of the first channel obtained in step S100 by the importance weight of the first channel, by adding the importance weight of the first channel to the feature data of the first channel, or by subtracting the importance weight of the first channel from the feature data of the first channel. Particularly, when the recalibration is performed by multiplying the feature data of the first channel by the importance weight of the first channel, the importance weight may be reflected most naturally.

According to some embodiments, in step S300, the calculation method between the feature data and the importance weight to obtain the recalibrated feature data may be different in at least some channels. For example, the feature data of the first channel may be recalibrated by multiplying the feature data of the first channel by the importance weight of the first channel, and the feature data of the second channel may be recalibrated by adding the importance weight of the second channel to the feature data of the second channel. In some embodiments, the calculation method between the feature data and importance weight of each channel may be predefined for the filter of each channel. In one embodiment, for each filter, the calculation method which has a high recalibration efficiency for the feature data obtained by applying the corresponding filter may be predefined. Further, in some embodiments, the calculation method between the feature data and importance weight of each channel may also be learned along with the learning of the entire neural network and then may be set to one of the predefined calculation methods.

Next, in step S400, updating subsequent layers is performed by using the recalibrated feature data. In some embodiments, considering back propagation of a loss, updating subsequent layers may precede updating the layer for recalibration and the convolution layer. Step S100 to Step S400 are iterated until there is no remaining training data (S500).

Next, the recalibration method according to various embodiments is described in detail with reference to FIG. 3 to FIG. 7.

Figure 3:
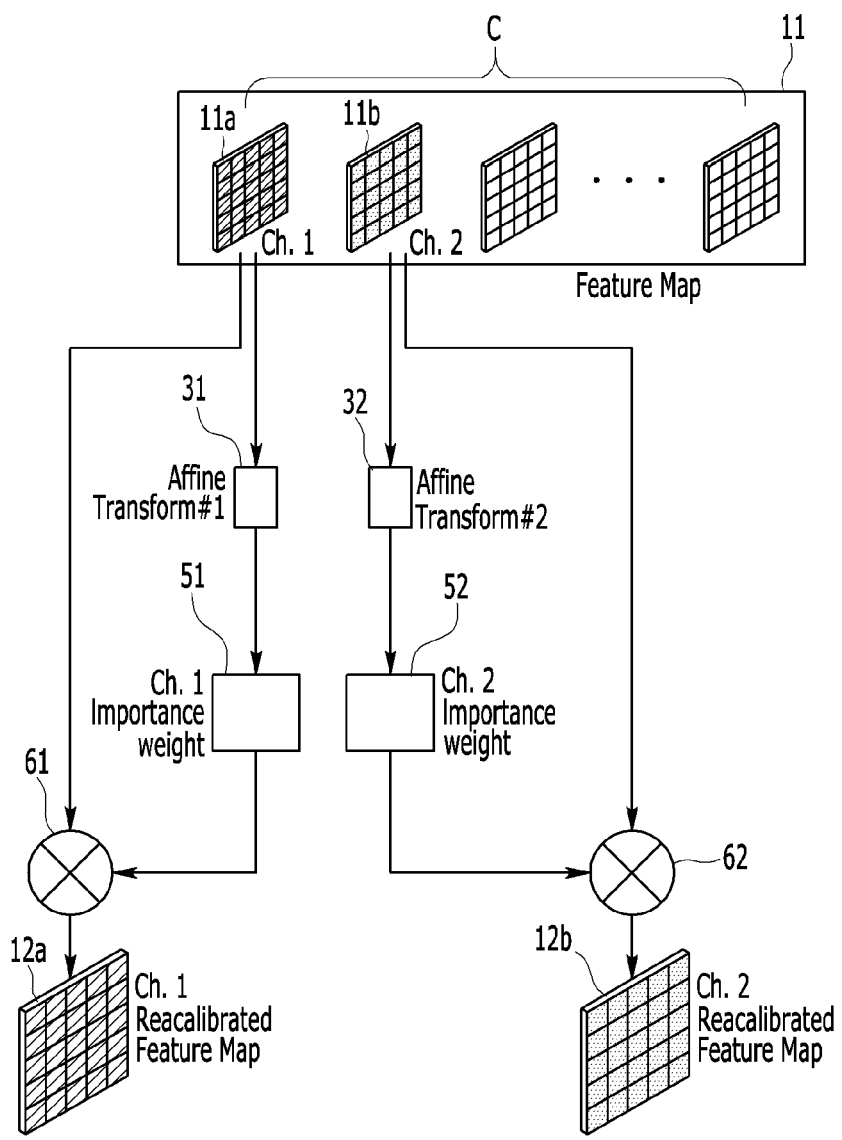
FIG. 3 is a diagram showing a feature data recalibration method according to a first embodiment.

FIG. 3 is a diagram showing a feature data recalibration method according to a first embodiment. As shown in FIG. 3, a plurality of feature data 11 on which recalibration is to be performed include a feature data 11a of a first channel and a feature data 11b of a second channel. An affine transformation 31 applied to the feature data 11a of the first channel is different from an affine transformation 32 applied to a feature data 11b of the second channel. An importance weight 51 of the first channel is obtained by using a result of the affine transformation 31 of the first channel, and an importance weight 52 of the second channel is obtained by using a result of the affine transformation 32 of the second channel After the feature data 11a of the first channel passes through calculation 61 for adjusting the feature data 11a by reflecting the importance weight 51 of the first channel, a recalibrated feature data 12a is obtained. In addition, after the feature data 11b of the second channel passes through calculation 62 for adjusting the feature data 11b by reflecting the importance weight 52 of the second channel, a recalibrated feature data 12b of the second channel is obtained.

Figure 4:
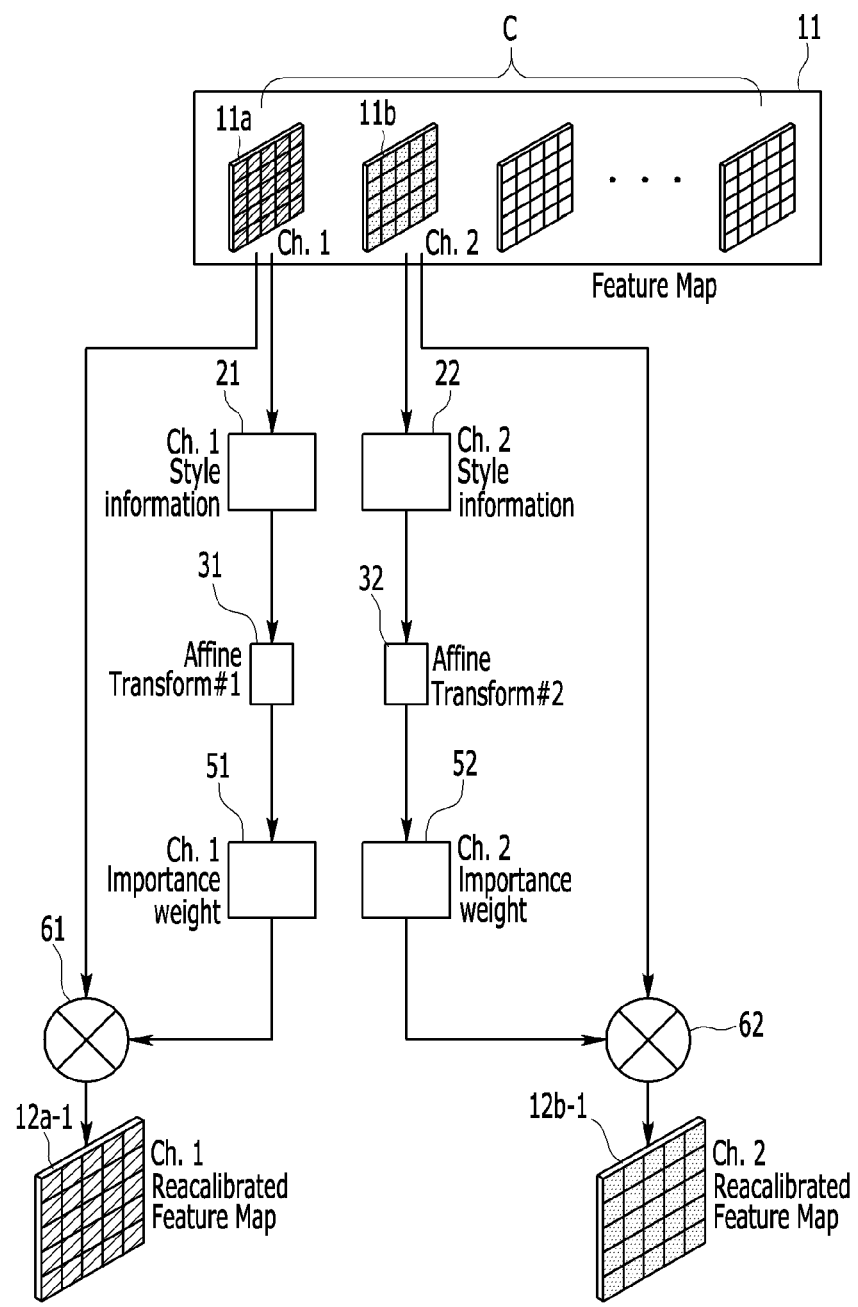
FIG. 4 is a diagram showing a feature data recalibration method according to a second embodiment.

FIG. 4 is a diagram showing a feature data recalibration method according to a second embodiment. As shown in FIG. 4, style information is obtained from a feature data of each channel, and an importance weight of each channel is obtained through affine transformation on the style information. When an input data is an image, the feature data may be a two-dimensional feature map, and the style information may include a plurality of statistical representative values of feature values included in the feature map. The statistical representative values may include, for example, a first statistical representative value and second statistical representative value of feature values included in the feature map. Depending on embodiments, various combinations of the statistical representative value may be used. For example, the first statistical representative value may be an average value, and the second statistical representative value may be a standard deviation. Since the style information of the image may be represented by an average and standard deviation of pixel values, when the input data is an image, the style information of the data may be accurately represented in a case the first representative value is an average and the second representative value is a standard deviation. As another example, the first statistical representative value may be an average and standard deviation of feature values included in the feature map, and the second statistical representative value may be a gram matrix.

Since the style information is configured by using the statistical representative values of the feature values included in the feature map, an amount of information is less than an amount of the feature map. Therefore, obtaining importance information by performing affine transformation on the style information has faster computational speed than obtaining importance information by performing the affine transformation on the feature map. In this case, the importance information may indicate information about an importance weight.

Figure 5:
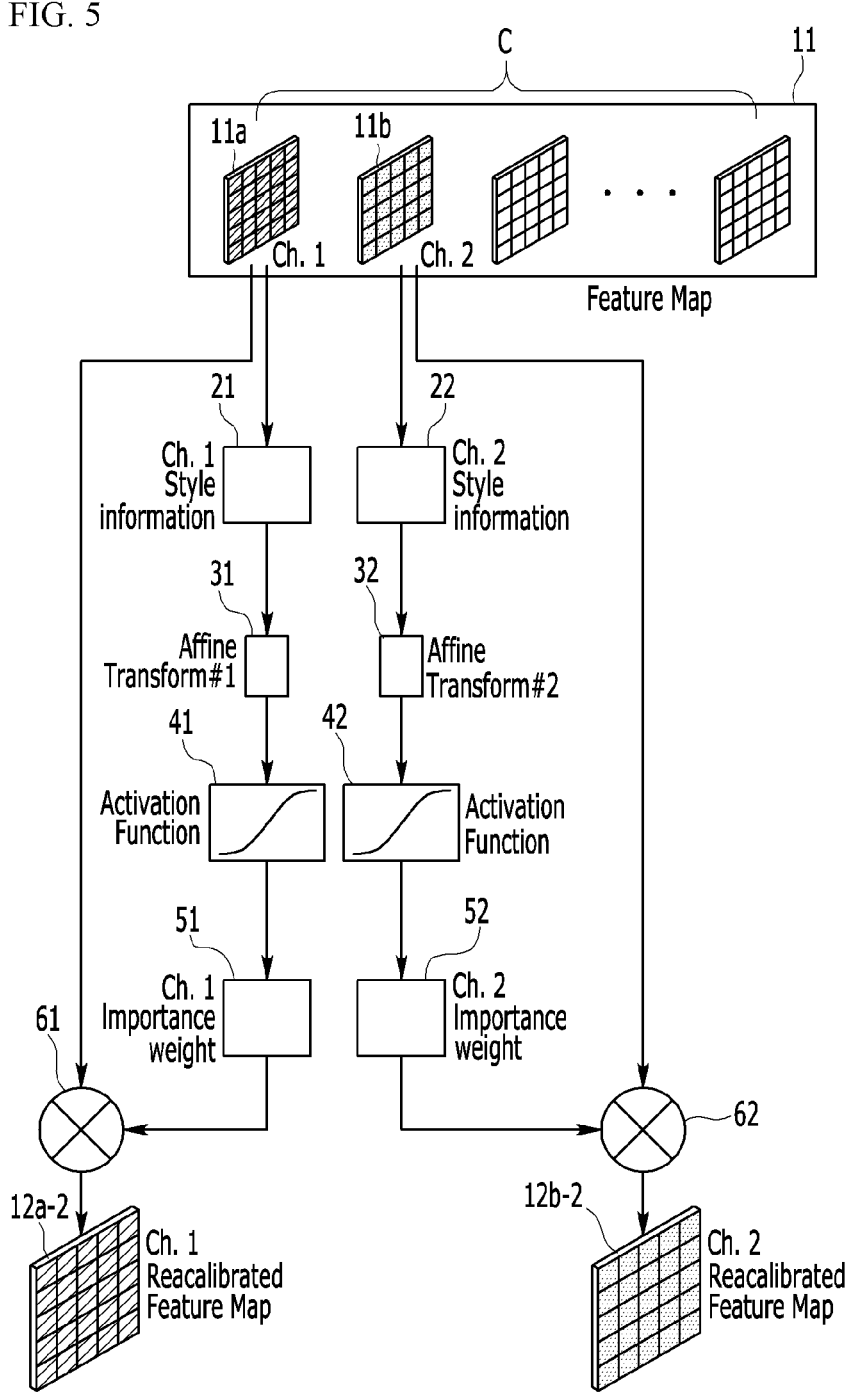
FIG. 5 is a diagram showing a feature data recalibration method according to a third embodiment.

FIG. 5 is a diagram showing a feature data recalibration method according to a third embodiment. As shown in FIG. 5, importance information may be obtained by applying an activation function 41 or 42 to a result of affine transformation. The activation function 41 or 42 may be one of various well-known activation functions including sigmoid function and ReLU (rectified linear unit).

In one embodiment, the same activation function may be applied to all channels. In another embodiment, a different activation function may be applied to each channel.

Figure 6:
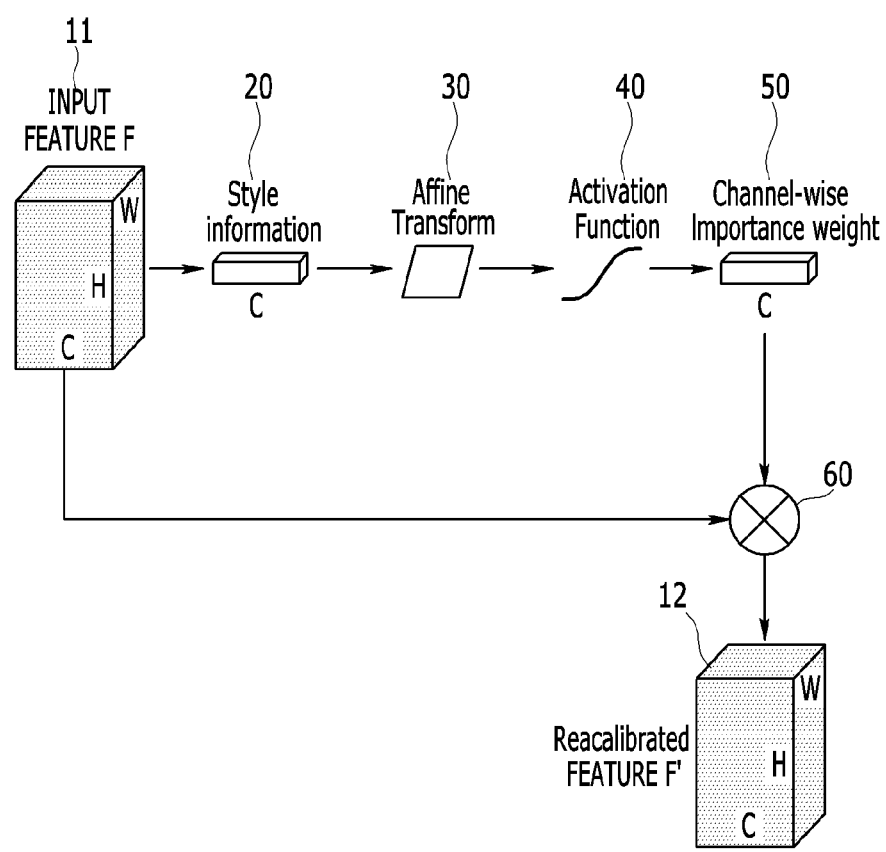
FIG. 6 and FIG. 7 are diagrams for explaining a feature data recalibration method described with reference to FIG. 5.
Figure 7:
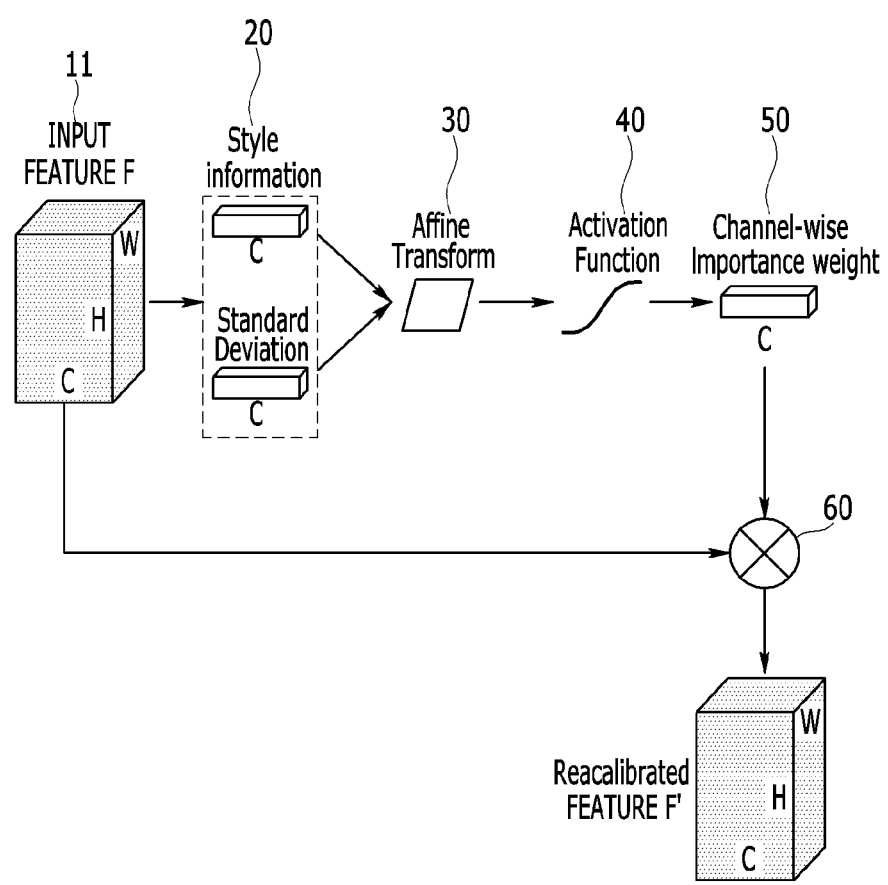

FIG. 6 and FIG. 7 are diagrams for explaining a feature data recalibration method described with reference to FIG. 5. FIG. 6 and FIG. 7 show a feature data recalibration method when an input data is an image and a feature data of each channel to be recalibrated includes a three-dimensional vector of width W, height H, and channel C. As shown in FIG. 6, a recalibrated feature data 12 of each channel is generated by extracting style information 20 (width of 1, height of 1, and channel of C), performing affine transformation 30, applying an activation function 40, generating an importance weight 50 (width of 1, height of 1, and channel of C) of each channel, and performing calculation 60 on the feature data of each channel in such a manner of reflecting the importance weight 50. As shown in FIG. 7, the style information 20 may include an average value and standard deviation of each channel.

The feature data recalibration method according to various embodiments described above may highly improve the performance when it is applied to a multi-domain learning which is configured to learn various styles of images together. This is due to obtaining importance information of each channel based on style information of each channel. That is, the feature data recalibration method according to various embodiment may be more useful when the input data to be learned includes an image data having first style information and other image data having a second style information. In addition, when the image data having the first style information and the other image data having the second style information are included in one batch, the feature data recalibration method according to the present embodiment may be more useful. When a difference between the first style information and the second style information exceeds a reference value, the feature data recalibration method according to the present embodiment may be more useful. In this regard, the feature data recalibration method according to the present embodiment may be machine-learned so as to be selectively applied when various styles of images are input.

The concepts of embodiments of the present disclosure described above with reference to FIG. 1 to FIG. 7 may be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on a computer-readable recording medium may be transmitted to another computing apparatus via a network such as the Internet and installed in another computing device, so that the computer program can be used in another computing device.

Next, a machine learning apparatus according to another embodiment of the present invention will be described with reference to FIG. 8. The machine learning apparatus according to the present embodiment may be implemented as a computing device which performs updating a convolution neural network by using training data, so that the output of the convolution neural network is fit for the purpose of machine learning. Although the machine learning apparatus is described as a single device in FIG. 8, when an amount of computations increases, a plurality of computing devices may perform computations associated with learning of the convolution neural network using parallel computing technology. In this case, each computing device may share information on the inter-node weights according to its computation results with other computing devices.

Hereinafter, an example computing device 100 for implementing a machine learning apparatus 100 according to various embodiments of the present disclosure is described with reference to FIG. 8. FIG. 8 is an example hardware diagram showing a computing device 100 according to an embodiment.

Figure 8:
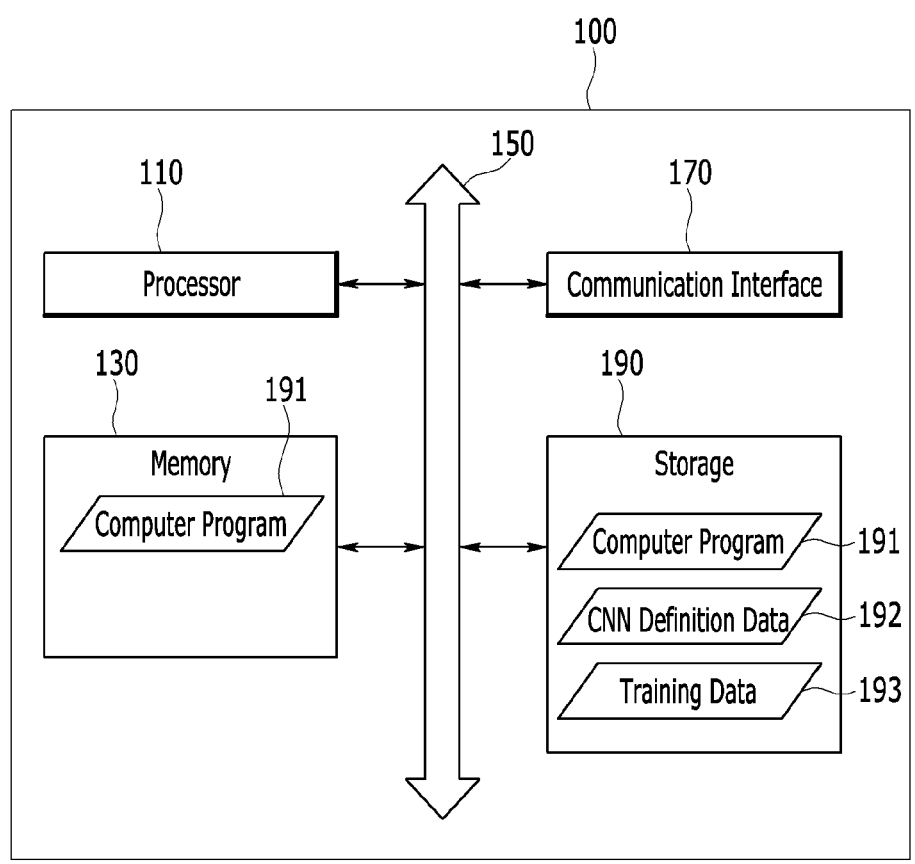
FIG. 8 is a hardware diagram showing a machine learning apparatus according to an embodiment of the present disclosure.

As shown in FIG. 8, the computing device 100 may include one or more processors 110, a system bus 150, a communication interface 170, a memory 130 where a computer program 191 to be executed by the processor 110 is loaded, and a storage 190 which stores the computer program 191, CNN definition data 192, and training data 193. However, FIG. 8 shows only elements related to embodiments of the present disclosure. Therefore, the person of ordinary skill in the art will understand that general elements other than those shown in FIG. 8 may be further included. In other words, various elements other than those shown in FIG. 8 may be further included in the computing device 100.

The processor 110 controls overall operations of each element of the computing device 100. The processor 110 may be configured to include at least one of a central processing unit (CPU), a microprocessor unit (MPU), a microcontroller unit (MCU), a graphics processing unit (GPU), and any form of processor well known in the art of the present disclosure. The computing device may include one or more processors. The processor 110 may be a processor having structure specialized for machine learning rather than be a general purpose processor.

The memory 130 stores various kinds of data, commands, and/or information. To execute methods or operations according to various embodiments of the present disclosure, the memory 130 may load one or more programs 191 from the storage 190. The memory 130 may be implemented as a volatile memory such as a random access memory (RAM), but the technical scope of the present disclosure is not limited thereto.

The bus 150 provides a communication function between elements of the computing device 100. The bus 150 may be implemented as various forms of buses, such as an address bus, a data bus, a control bus.

The communication interface 170 supports wired or wireless Internet communication of the computing device 100. Further, the communication interface 170 may support various communication methods as well as Internet communication. To this end, the communication interface 170 may include a communication module well known in the art of the present disclosure. In some embodiments, the communication interface 170 may be omitted.

The storage 190 may non-temporarily store the one or more programs 191. The storage 190 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 191 stored in the storage 190 and loaded into the memory 130 when executed by the operating system performs an operation of learning a CNN-based neural network using the training data 193. As a result of the operation of the computer program 191, the CNN definition data 192 for defining the CNN-based neural network may be stored in the storage 190. The CNN definition data 192 may be transmitted to the other computing device via the communication interface 170 as a model that generates an output fit for the learning purpose. The other computing device may use the model to perform inference. For example, a location of a lesion in a medical image may be inferred.

The computer program 191 may include one or more instructions which cause the processor 110 to perform methods or operations according to various embodiments of the present disclosure after loaded on the memory 130. In other words, the processor 110 may execute methods or operations according to various embodiments of the present disclosure by performing the one or more instructions. The instructions are a series of computer-readable instructions that are grouped by function and are executed by a processor or a component of a computer program.

For example, the computer program 191 may include an instruction to obtain a feature data of a first channel and a feature data of a second channel that are generated by a CNN, an instruction to obtain an importance weight of the first channel through a first affine transformation of the feature data of the first channel, an instruction to obtain an importance weight of the second channel through a second affine transformation of the feature data of the second channel, an instruction to recalibrate the feature data of the first channel by reflecting the importance weight of the first channel, and an instruction to recalibrate the feature data of the second channel by reflecting the importance weight of the second channel Here, the first and the second transformations may differ from each other.

Next, a medical image analysis system according to another embodiment of the present invention is described with reference to FIG. 9.

Figure 9:
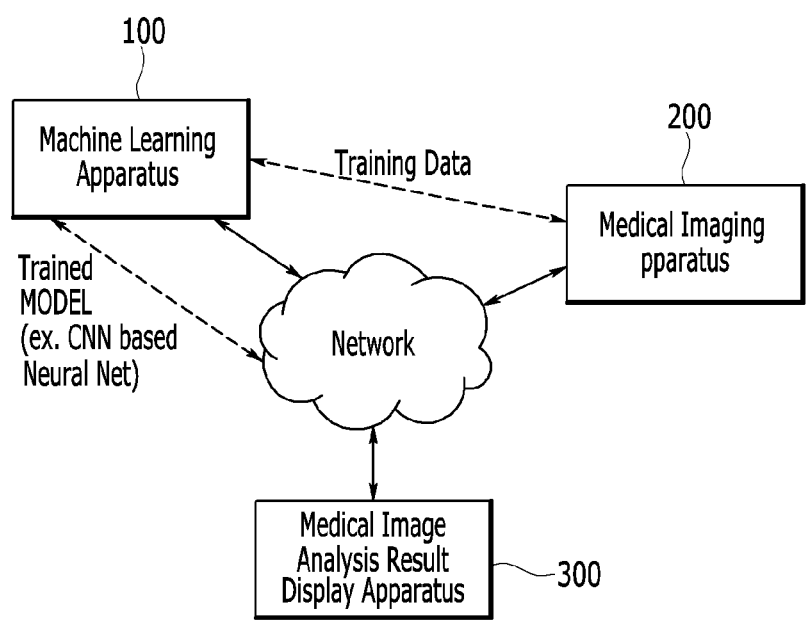
FIG. 9 is a diagram for explaining a medical image analysis system according to an embodiment of the present disclosure.

As shown in FIG. 9, the medical image analysis system according to the present embodiment includes a medical imaging apparatus 200 and a machine learning apparatus 100. Depending on embodiments, the medical image analysis system may further include a medical image analysis result display apparatus 300.

The medical imaging apparatus 200 is a device for capturing a medical image of human body, such as an X-ray, a CT, or MRI. The medical imaging apparatus 200 provides the captured image data to the machine learning apparatus 100 via a network. Since the medical image is sensitive personal information, a network may block external access. For example, the machine learning apparatus 100 and the medical imaging apparatus 200 may be located in the same hospital.

The machine learning apparatus 100 shown in FIG. 9 may be the same as that shown in FIG. 8. The machine learning apparatus 100 may accumulate image data provided from the medical imaging apparatus 200. When the accumulated image data satisfy a machine learning standard, the machine learning apparatus 100 may highly learn a model for producing output data fit for the purpose of the machine learning by using the accumulated image data. During this process, the feature data recalibration method described above with reference to FIG. 1 to FIG. 7 may be performed.

The definition data of the model learned by the machine learning apparatus 100 may be transmitted to the medical image analysis result display apparatus 300. The medical image analysis result display apparatus 300 may be located outside a hospital where the medical imaging apparatus 200 is located, unlike the machine learning apparatus 100. The medical image analysis result display apparatus 300 may receive and store the definition data of the model from the machine learning apparatus 100, input an analysis target medical image into the model, obtain analysis result data, perform rendering on the analysis result data, and provide an inference result of the medical image by displaying the rendered result on the screen.

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by the person of ordinary skill in the art that various changes in form and detail may be made therein without departing from the spirit and scope of the present disclosure as defined by the following claims. The embodiments should be considered in a descriptive sense only and not for purposes of limitation.

What is claimed is:

1. A feature data recalibration method performed by a computing device, comprising:
    receiving a feature data of each of a plurality of channels generated by a convolution neural network; and
    recalibrating the feature data of each of the plurality of channels by performing independent affine transformation on the feature data of each of the plurality of channels,
    wherein recalibrating the feature data of each of the plurality of channels comprises:
        obtaining an importance weight of a first channel among the plurality of channels by performing a first affine transformation on the feature data of the first channel;
        obtaining an importance weight of a second channel among the plurality of channels by performing a second affine transformation on the feature data of the second channel, the second affine transformation having at least one different parameter from the first affine transformation;
        recalibrating the feature data of the first channel by reflecting the importance weight of the first channel; and
        recalibrating the feature data of the second channel by reflecting the importance weight of the second channel,
    wherein obtaining the importance weight of the first channel by performing the first affine transformation on the style information of the two-dimensional feature map of the first channel comprises:
        performing the first affine transformation on the style information of the two-dimensional feature map of the first channel; and
        obtaining the importance weight of the first channel by applying an activation function to a result of the first affine transformation, and wherein the image data input to the convolution neural network includes an image data of a first style and an image data of a second style.

2. The method of claim 1, wherein the style information of the two-dimensional feature map of the first channel includes an average and standard deviation of feature values of the two-dimensional feature map of the first channel.

3. The method of claim 1, wherein obtaining the importance weight of the first channel by performing the first affine transformation on the style information of the two-dimensional feature map of the first channel comprises:
  performing the first affine transformation on the style information of the two-dimensional feature map of the first channel; and
  obtaining the importance weight of the first channel by applying an activation function to a result of the first affine transformation.

4. The method of claim 1, wherein a parameter of the first affine transformation is learned when the convolution neural network by using the feature data of the first channel, and
  wherein the parameter of the second affine transformation is learned when the convolution neural network is learned by using the feature data of the second channel.

5. The method of claim 1, wherein recalibrating the feature data of the first channel comprises setting a result obtained by multiplying the feature data of the first channel by the importance weight of the first channel as a recalibrated feature data of the first channel.

6. A machine learning apparatus comprising:
  a memory storing one or more instructions; and
  a processor executes the one or more instructions to receive a feature data of each of a plurality of channels generated by a convolution neural network, and to recalibrate the feature data of each of the plurality of channels by performing independent affine transformation on the feature data of each of the plurality of channels,
  wherein recalibrating the feature data of each of the plurality of channels comprises:
    obtaining the feature data of a first channel among the plurality of channels and the feature data of a second channel among the plurality of channels;
    obtaining an importance weight of a first channel among the plurality of channels by performing a first affine transformation on the feature data of the first channel;
    obtaining an importance weight of a second channel among the plurality of channels by performing a second affine transformation on the feature data of the second channel, the second affine transformation being different from the first affine transformation;
    recalibrating the feature data of the first channel by reflecting the importance weight of the first channel; and
    recalibrating the feature data of the second channel by reflecting the importance weight of the second channel,
  wherein a data input to the convolution neural network is an image data,
  wherein the feature data of the first channel includes a two-dimensional feature map of the first channel,
  wherein the processor obtains the importance weight of the first channel by performing the first affine transformation on style information of the two-dimensional feature map of the first channel, and
  wherein the image data input to the convolution neural network includes an image data of a first style and an image data of a second style.

7. The machine learning apparatus of claim 6, wherein the processor obtains the importance weight of the first channel by performing the first affine transformation on the style information of the two-dimensional feature map of the first channel and applying an activation function to a result of the first affine transformation.

8. The machine learning apparatus of claim 6, wherein a parameter of the first affine transformation is learned when the convolution neural network is learned by using the feature data of the first channel, and a parameter of the second affine transformation is learned when the convolution neural network is learned by using the feature data of the second channel.

9. The machine learning apparatus of claim 6, wherein the processor sets a result obtained by multiplying the feature data of the first channel by the importance weight of the first channel as a recalibrated feature data of the first channel.

10. A computer program stored in a non-transitory computer-readable medium, for causing a computing device to execute:
  receiving a feature data of each of a plurality of channels generated by a convolution neural network; and
  recalibrating the feature data of each of the plurality of channels by performing independent affine transformation on the feature data of each of the plurality of channels,
  wherein recalibrating the feature data of each of the plurality of channels comprises:
    obtaining the feature data of a first channel among the plurality of channels and the feature data of a second channel among the plurality of channels;
    obtaining an importance weight of a first channel among the plurality of channels by performing a first affine transformation on the feature data of the first channel and obtaining an importance weight of a second channel among the plurality of channels by performing a second affine transformation on the feature data of the second channel, the second affine transformation being different from the first affine transformation; and
    recalibrating the feature data of the first channel by reflecting the importance weight of the first channel and recalibrating the feature data of the second channel by reflecting the importance weight of the second channel,
  wherein a data input to the convolution neural network is an image data,
  wherein the feature data of the first channel includes a two-dimensional feature map of the first channel,
  wherein obtaining the importance weight of the first channel comprises obtaining the importance weight of the first channel by performing the first affine transformation on style information of the two-dimensional feature map of the first channel, and
  wherein the image data input to the convolution neural network includes an image data of a first style and an image data of a second style.

11. The computer program of claim 10, wherein obtaining the importance weight of the first channel by performing the first affine transformation on the style information of the two-dimensional feature map of the first channel comprises:
  performing the first affine transformation on the style information of the two-dimensional feature map of the first channel; and obtaining the importance weight of the first channel by applying an activation function to a result of the first affine transformation.

12. The computer program of claim 10, wherein a parameter of the first affine transformation is learned when the convolution neural network is learned by using the feature data of the first channel, and the parameter of the second affine transformation is learned when the convolution neural network is learned by using the feature data of the second channel.

* * * * *